United States Patent [19]
Crutchfield

[11] Patent Number: 5,357,061
[45] Date of Patent: Oct. 18, 1994

[54] DIGITIZER TABLET HAVING HIGH PERMEABILITY GRID SHIELD

[75] Inventor: Randolph E. Crutchfield, Scottsdale, Ariz.

[73] Assignee: CalComp Inc., Anaheim, Calif.

[21] Appl. No.: 877,831

[22] Filed: Apr. 30, 1992

[51] Int. Cl.$^5$ .................................... G08C 21/00
[52] U.S. Cl. .................................................. 178/18
[58] Field of Search .................... 178/18–20; 340/712

[56] References Cited

U.S. PATENT DOCUMENTS

| | | | |
|---|---|---|---|
| 4,645,869 | 2/1987 | Rockwell et al. | 178/18 |
| 4,704,501 | 11/1987 | Taguchi et al. | 178/19 |
| 5,130,500 | 7/1992 | Murakami et al. | 178/19 |
| 5,218,173 | 6/1993 | Garwin et al. | 178/18 |

Primary Examiner—Stephen Chin
Assistant Examiner—Paul Loomis
Attorney, Agent, or Firm—Wm. F. Porter, Jr.; Donald A. Streck

[57] ABSTRACT

A combined shield member and grid shield for a digitizer tablet having conductive grids on a flexible substrate comprising a sheet of a metal having a high magnetic permeability substantially the size of a square X-Y axis coordinate system of the digitizer tablet shielding the flexible substrate. Preferably, the metal has an initial permeability of at least 5,000. The metal can be a NiFe alloy having an initial permeability sufficiently high to qualify it as a $\mu$-metal. Typically, the sheet of metal is a square sheet of substantially the size of a square X-Y axis coordinate system of the digitizer tablet and the flexible substrate has edge portions which extend beyond side edges of the sheet of metal and are wrapped around the side edges. An alternate embodiment employs the high permeability shield positioned between two rigid substrates carrying the grids and interconnects respectively. A conductive metal foil over the surface of the substrate corrects any signal errors introduced by the shield. The foil can also be grounded for electostatic shielding.

33 Claims, 3 Drawing Sheets

DIGITIZER TABLET HAVING HIGH PERMEABILITY GRID SHIELD

BACKGROUND OF THE INVENTION

This invention relates to digitizer tablets and, more particularly, in a digitizer tablet having conductive grids on a substrate, to the improvement to reduce weight and thickness while improving signal strength and shielding characteristics comprising, a shield member adjacent the substrate wherein the shield member is of a metal having a high magnetic permeability.

Digitizer tablets operating according to electro-magnetic principles are well known in the art. A horizontal grid of wires and a vertical grid of wires in the tablet define a square X-Y axis coordinate system. A cursor is then moved over the X-Y axis coordinate system of the tablet to provide operator inputs. Appropriate electronics in the tablet and the cursor allow the position of the cursor on the X-Y axis coordinate system of the tablet to be ascertained. Some times the wires of the grids are the active members to create magnetic fields sensed by the cursor and sometimes the cursor is the active member creating a magnetic field that is sensed in the two grids of wires.

The assignee of this invention favors the latter approach wherein the cursor is the active member. While earlier digitizer tablets had the cursor electrically connected to the tablet with a connecting cable, more recently the cursor is powered with a battery and has no connecting cable to create a so-called "cordless cursor" system.

The assignee of this invention also developed digital tablets wherein the horizontal and vertical grids of wires (which originally were, in fact, wires manually run and soldered to a frame) are formed by runs of electrically conductive ink silk-screened onto a flexible substrate such as Mylar. Such a tablet 10 is depicted in FIG. 1. The tablet 10 comprises a flexible substrate 12 having the grid wires silk-screened thereon according to techniques which are not important to the present invention. Typically, the tablet 10 is formed by laying the substrate 12 on a support member 14 of an insulating material, such as printed circuit board material, and wrapping the edges 16 around the edge of the support member 14. The entire tablet 10 is then mounted inside a protective plastic case which includes the necessary electronics and connective wiring.

While the construction of FIG. 1 reduced the cost of manufacture substantially, particularly in smaller digitizer tablets useful with personal computers and the like, it created certain problems. In particular, as the cursor 18 is moved towards an edge 20 of the working portion of the tablet 10 (i.e. that portion defining the X-Y axis coordinate system), the emitted magnetic field 22 from the cursor 18 passes through the support member 14 and induces undesired currents into the wiring of the edges 16 of the grid system on the substrate 12. This can result in false readings, "jitters", and the like.

To eliminate these problems, the assignee of this invention developed a grid shielding system as depicted in simplified form in FIG. 2. By adding a thin sheet of aluminum as a grid shield 24 under the support member 14, the emitted magnetic field 22 from the cursor 18 passing through the support member 14 is shunted through the aluminum of the grid shield 24 and prevented from reaching the edges 16 of the grid system on the substrate 12.

While the aluminum grid shield 24 of FIG. 2 solved one problem, it created another. When the support member 14 is thin (as only required to support the flexible substrate 12), the aluminum grid shield 24 is positioned too close to the grid wires of the working portion of the substrate 12. Being a good conductive material, the aluminum of the grid shield 24 reduces the effectiveness of the emitted magnetic field 22 from the cursor 18 in inducing sensible signals in to the wires of the grids by the creation of eddy currents in the aluminum of the grid shield 24. To solve this problem, the thickness of the support member is increased to act as a spacer with respect to the aluminum grid shield 24 as depicted in FIG. 3.

Digitizers using a shield plate are known in the art. See, for example, U.S. Pat. Nos. 4,645,869 and 4,956,526. The shielding in the '869 patent attempts to reduce the signal induced in the grid interconnect conductors; but, requires a relatively thick grid assembly. By contrast, the shielding in the system of the '526 patent is for the purpose of blocking disturbing electromagnetic waves from reaching the grid; and, it is not for the purpose of preventing the signal from reaching the grid interconnect wires on the backside as depicted in FIGS. 2 and 3. The shield plate in these grids still attenuates the signal and the amount of attenuation increases as the space between the grid and the shield plate decreases.

In a corded digitizer tablet wherein power is supplied to the cursor from the tablet and power at the cursor is no problem, the solution of FIG. 3 in various embodiments for different tablet constructions worked well for its intended purpose. With the introduction of the cordless cursors, however, a new problem developed. The cordless cursors are powered by a small lithium hearing aid type of battery. Power and battery drain, therefore, become a significant problem. Signal strength of the magnetic field from the cordless cursor is kept to a minimum in order to minimize the power consumption. With this low-power signal, the construction of FIG. 3 does not work well. While the aluminum grid shield spaced from the grid wires blocks most of the magnetic field of the cursor from reaching the backside wires, the eddy currents essentially still buck the coordinate signal being developed and a significant portion of the signal is still lost. To make it work, the output of the transducer in the cursor (and corresponding battery current) must be high enough to overcome the attenuation. As a result, power consumption is much larger than desired for cordless cursor operation and battery life. Also, in the new, smaller cordless digitizer tablets being developed for pen-driven computing systems, the thickness of the aluminum and the spacing support member required for proper operation make the resultant tablet much thicker and heavier than desirable.

Wherefore, it is an object of the present invention to provide a way in which the thickness and weight of a cordless digitizer tablet can be reduced without impairing its operability.

It is another object of the present invention to provide a cordless digitizer tablet having a cursor with minimal battery current drain requirements.

It is still another object of the present invention to provide a way of shielding the grids of a cordless digitizer tablet without diminishing the strength of the signal of interest.

It is yet another object of the present invention to provide a way of shielding the grids of a cordless digitizer tablet in a manner which also increases the strength of the signal of interest.

Other objects and benefits of the invention will become apparent from the detailed description which follows hereinafter when taken in conjunction with the drawing figures which accompany it.

SUMMARY

The foregoing object has been attained by the combined support member and grid shield for a digitizer tablet having conductive grids on a substrate of the present invention comprising, a sheet of a metal having a high magnetic permeability substantially the size of a square X-Y axis coordinate system of the digitizer tablet disposed close adjacent the substrate.

Where the substrate is flexible, the sheet of metal may be used to support the substrate.

Where the substrate is rigid having the conductive grids on one substrate and interconnect wiring on another substrate, the sheet of metal may be disposed between the two substrates.

Preferably, the sheet of metal is a metal having an initial permeability of at least 5,000. The sheet of metal can be a NiFe alloy having a permeability sufficiently high to qualify it as a $\mu$-metal.

Typically, the sheet of metal is a square sheet of substantially the size of a square X-Y axis coordinate system of the digitizer tablet and the flexible substrate has edge portions which extend beyond side edges of the sheet of a metal and are wrapped around the side edges.

A conductive sheet can be disposed over the periphery of the substrate to reduce any signal errors introduced by the high permeability metal shield material. The conductive sheet can also be grounded to provide an electrostatic shield.

DESCRIPTION OF THE PREFERRED EMBODIMENT

Figure 4:
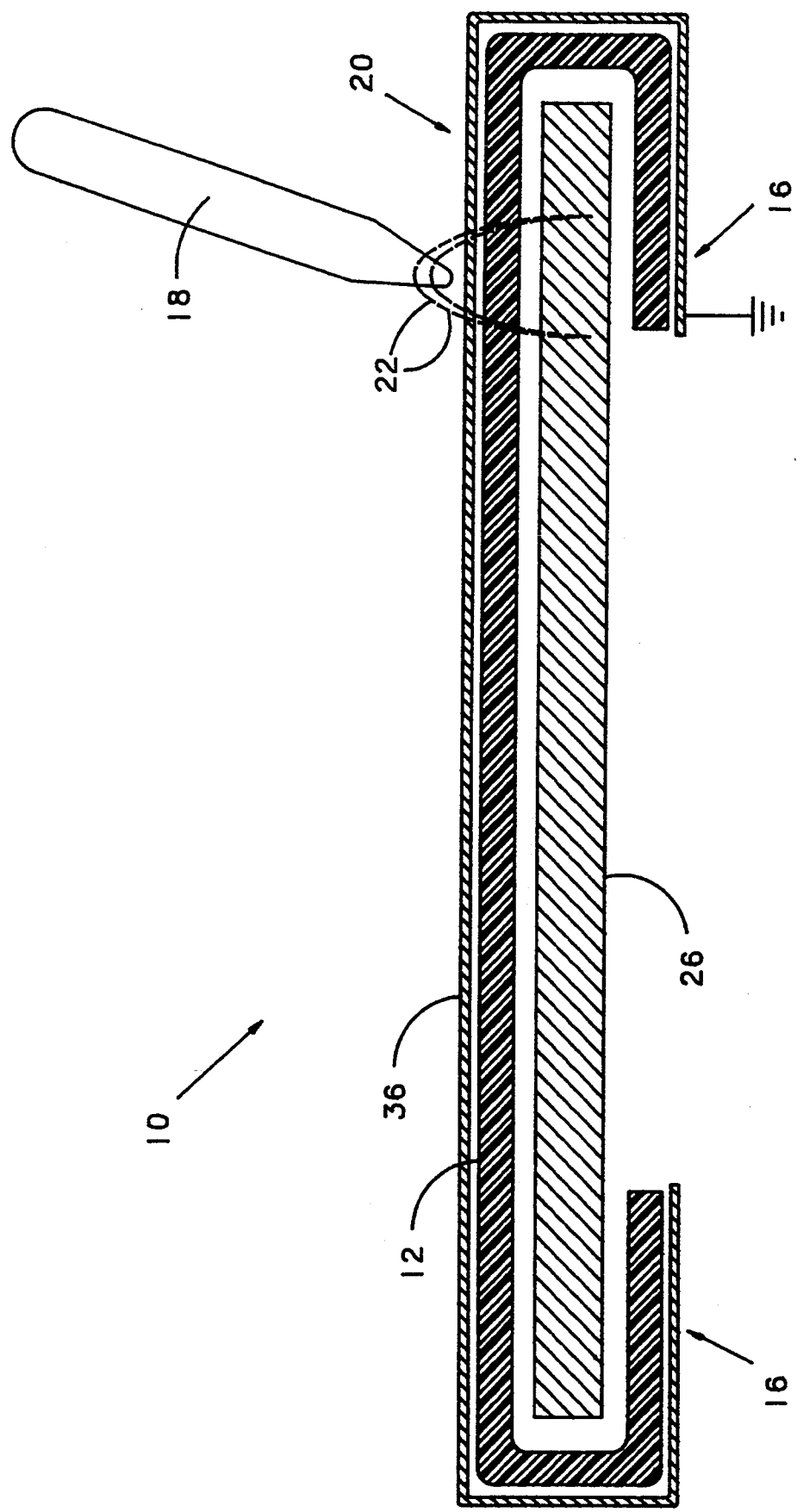
FIG. 4 is an enlarged, simplified, cross-section through a digitizer tablet according to the present invention having a grid shield of a high permeability metal which also acts as the support member.

As depicted in FIG. 4, the objects of the invention have been attained by replacing both the support member 14 and the aluminum grid shield 24 with a combined support member and grid shield labelled as 26. Typically the support/shield 26 will be a square sheet of material substantially the size of the square X-Y axis coordinate system of the digitizer tablet. The desired operating characteristics are obtained by making the support/shield 26 of a high permeability metal such as that generally referred to as $\mu$-metal. The quantity "$\mu$" is a measure of the magnetic permeability of a metal. Aluminum, for example, has a $\mu$ of about 1. Thus, the prior art aluminum shield only provides about 40% of the signal that would have been provided in a free space environment. A high permeability metal or $\mu$-metal such as a NiFe alloy will have a $\mu$ or magnetic permeability in the thousands. For example, that employed by the assignee of this invention in tested embodiments as sold under the tradename CO-NETIC has an initial permeability of about 30,000. The tests also indicate that for proper performance, the material of the support/shield 26 should have an initial permeability of at least 5,000; thus, it is preferred that the support/shield 26 have an initial permeability of at least 5,000. Because of the material's magnetic properties, a much thinner piece can be used while still providing adequate shielding for the conductors behind the grid. Also, a spacer is no longer needed because the material assists the signal rather than bucking it as depicted in FIG. 4. That is, instead of absorbing the magnetic signal as created eddy currents, the magnetic dipoles of the high permeability metal tend to become aligned in a direction to assist the external magnetic field (i.e. the signal). Thus, the signal response is about two times what it would be in free space.

Figure 1:
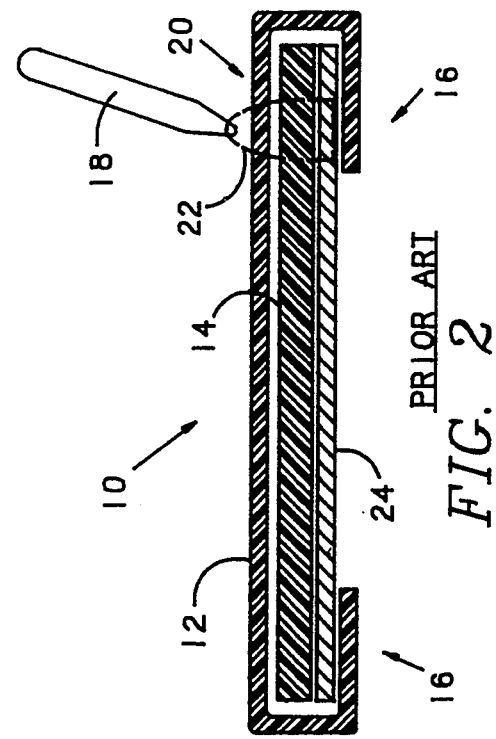
FIG. 1 is a simplified cross-section through a prior art digitizer tablet having a support member and no grid shielding.
Figure 2:
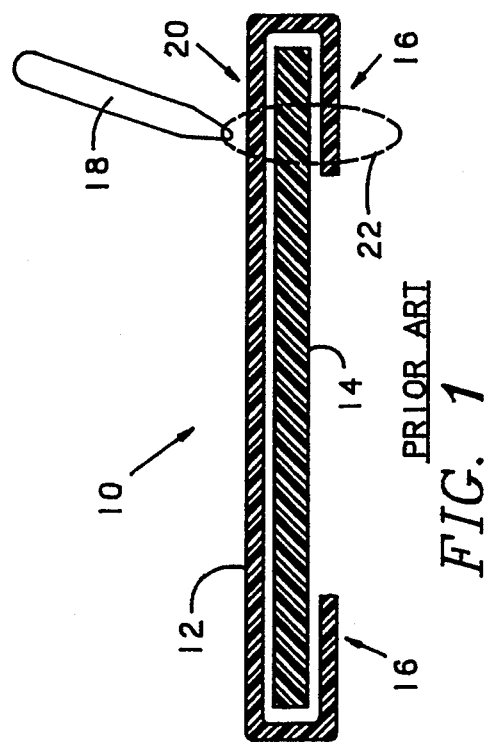
FIG. 2 is a simplified cross-section through a prior art digitizer tablet having an aluminum grid shield in addition to the support member.
Figure 3:
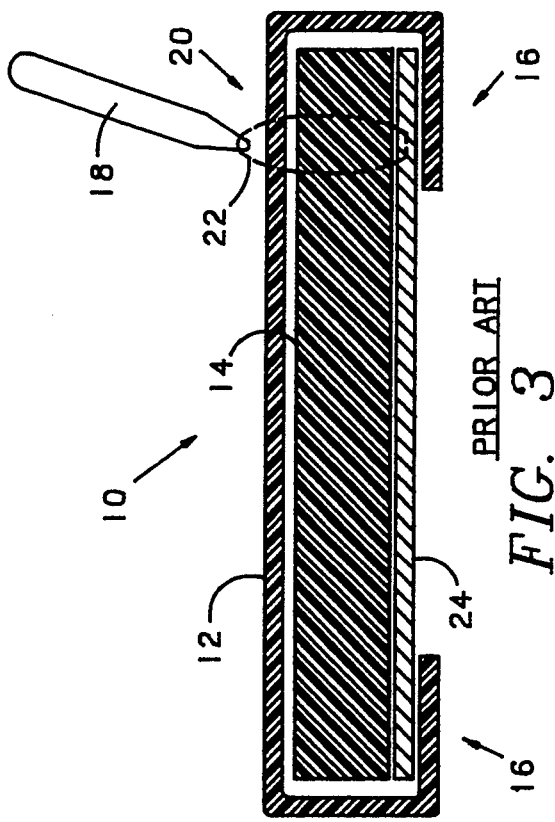
FIG. 3 is a simplified cross-section through a prior art digitizer tablet having an aluminum grid shield where the support member thickness is enlarged to act as a spacer and minimize problems caused by the aluminum grid shield.

Using the foregoing approach and construction as depicted in FIG. 4, manufactured and tested grid assemblies are only one-forth as thick as the prior art method of FIG. 3. In tests of cursors operating with such a shielded tablet, the battery current in the transducer has been reduced to less than one-half that required for successful operation with the aluminum and spacer grid construction of FIG. 3. The signal strength is larger than in free space, rather than less, and actually increases to about two times the free space signal strength as the grid to metal clearance is reduced to zero. Obviously, the replacement of a single component for two components also greatly simplifies the manufacturing process.

A side effect of using the high permeability material is a step error in the accuracy in between loops of a looped grid digitizer and a linear error across the grid in an unlooped digitizer. The errors are a result of the effect of the high permeability material on the signal. Since the errors are small and relatively constant, they can be subtracted out in the firmware performing the position calculations from the signal. It was found, however, that the errors can be eliminated simply and easily without any necessity of changing the firmware (a much more complex solution from a manufacturing point of view) by placing a thin conductive layer 36 such as aluminum or copper foil over the surface of the grid. Since the function of the conductive layer 36 is to develop eddy currents which, as it turns out, will offset the effects of the high permeability material on the signal, the conductive layer 36 must be thick enough and be of low resistance so as to allow the eddy currents to develop. Thus, it was found that a conductive ink coating did not provide the desired corrective action because it has too high a resistance. Similarly, a sputtered aluminum coating did not provide the desired corrective action because it was too thin to develop the necessary eddy currents.

Figure 5:
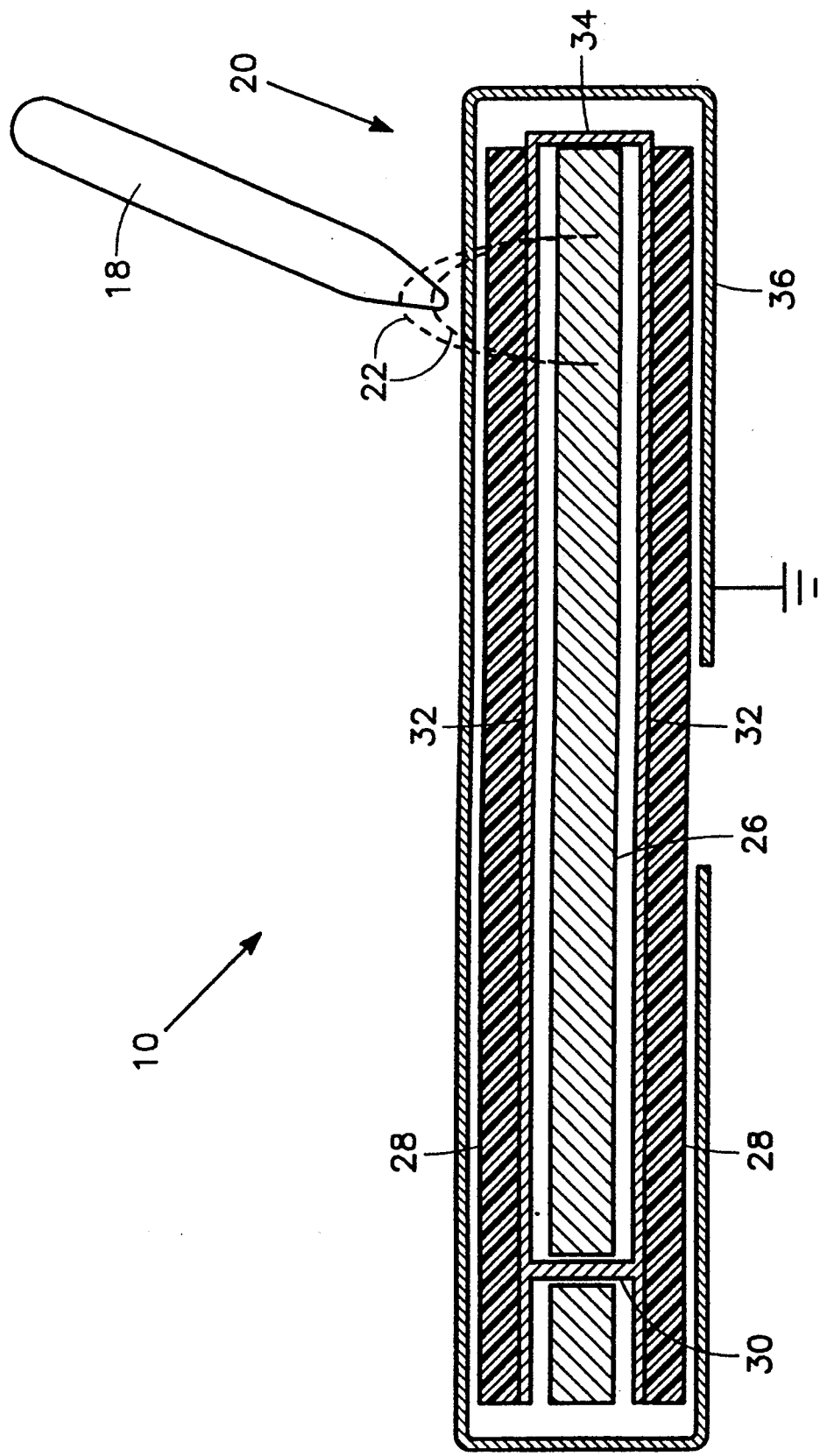
FIG. 5 is a simplified cross-section through a digitizer tablet according to the present invention having a grid layer shield of high permeability material located between two printed wiring board layers in a printed wiring board grid implementation.

The conductive layer 36 used in association with another implementation of the present invention is depicted in FIG. 5. In this case, printed wiring boards (PWBs) 28 are used for the substrate in place of the flexible substrate 12 of the prior drawing figures. In such an implementation, the PWBs 28 have conductive runs 32 thereon defining the grids and interconnects. Typically, one PWB 28 has the grids and the other PWB 28 has the interconnects. The objects of this invention are obtained by placing a high permeability layer 26 between the two parallel PWBs 28 as depicted in FIG. 5. Electrical connection between the conductive runs 32 on the two boards can be made by edge conductors 34 or by conductive "vias" 30 through the high permeability layer 26 between the conductive runs 32, or both, disposed between the grid-side PWB 28 and the interconnect-side PWB 28.

As described in another co-pending patent application, it has been determined by the assignee of this invention that an electrostatic shield is advantageous for use with cordless digitizers because of their low signal strength (for battery conservation purposes). If the present invention is being used as part of a cordless digitizer system, the metal foil conductive layer 36 can be connected to ground potential as depicted in FIGS. 4 and 5. In such case, the conductive layer 36 serves a dual function by also acting as the electrostatic shield.

Wherefore, having thus described the present invention,

What is claimed is:

1. In a digitizer tablet having conductive grids on a substrate, the improvement to reduce weight and thickness while improving signal strength and shielding characteristics comprising:
    a) a shield member disposed one of (i) in contact with, and (ii) spaced from the substrate, and parallel thereto, said shield member being of a metal having a high magnetic permeability; and wherein,
    b) the substrate comprises a pair of rigid substrates disposed in spaced parallel planes, one rigid substrate having the conductive grids thereon and one rigid substrate having interconnects thereon; and,
    c) said shield member is disposed between said pair of rigid substrates.

2. In a digitizer tablet having conductive grids on a substrate, the improvement to reduce weight and thickness while improving signal strength and shielding characteristics comprising:.
    a) a shield member disposed one of (i) in contact with, and (ii) spaced from the substrate, and parallel thereto, said shield member being of a metal having a high magnetic permeability; and,
    b) a low resistance, eddy current-developing conductive material disposed over an outer surface of the substrate whereby signal errors caused by said shield member are reduced.

3. The improvement to a digitizer tablet of claim 1 wherein:
    said metal is a metal having an initial permeability of at least 5,000.

4. The improvement to a digitizer tablet of claim 1 wherein:
    said metal is a NiFe alloy having an initial permeability sufficiently high to qualify it as a mu-metal.

5. The improvement to a digitizer tablet of claim 2 wherein:
    said low resistance, eddy current-developing conductive material is a metal foil.

6. The improvement to a digitizer tablet of claim 2 wherein:
    said low resistance, eddy current-developing conductive material is connected to a ground potential whereby said low resistance, eddy current-developing conductive material also acts as an electrostatic shield.

7. The improvement to a digitizer tablet of claim 2 wherein:
    a) the substrate is a flexible substrate; and,
    b) said shield member supports the flexible substrate.

8. A high efficiency digitizer tablet for use with a cordless electro-magnetic transmitting cursor to reduce required signal strength from the cursor and extend battery life thereof comprising:
    a) a flexible substrate having a pattern of conductive grids thereon;
    b) a support member of metal having a high magnetic permeability supporting said flexible substrate; and,
    c) a low resistance, eddy current-developing conductive material disposed over an outer surface of the substrate whereby signal errors caused by said support member are reduced.

9. The high efficiency digitizer tablet of claim 8 wherein:
    said low resistance, eddy current-developing conductive material is a metal foil.

10. The high efficiency digitizer tablet of claim 8 wherein:
    said low resistance, eddy current-developing conductive material is connected to a ground potential whereby said low resistance, eddy current-developing conductive material also acts as an electrostatic shield.

11. The high efficiency digitizer tablet of claim 8 wherein:
    said support member is a metal having an initial permeability of at least 5,000.

12. The high efficiency digitizer tablet of claim 8 wherein:
    said support member is a NiFe alloy having an initial permeability value sufficiently high to qualify it as a mu-metal.

13. The high efficiency digitizer tablet of claim 8 wherein:
    a) said support member is a square sheet of material substantially the size of a square X-Y axis coordinate system of the digitizer tablet; and,
    b) said flexible substrate has edge portions which extend beyond side edges of said support member and are wrapped around said side edges.

14. A combined support member and grid shield for a digitizer tablet having conductive grids on a flexible substrate comprising:
    a) a sheet of a metal having a high magnetic permeability substantially the size of a square X-Y axis coordinate system of the digitizer tablet supporting the flexible substrate; and,
    b) a low resistance, eddy current-developing conductive material disposed over an outer surface of the substrate whereby signal errors caused by said sheet of metal are reduced.

15. The combined support member and grid shield for a digitizer tablet of claim 14 wherein:
    said low resistance, eddy current-developing conductive material is a metal foil.

16. The combined support member and grid shield for a digitizer tablet of claim 14 wherein:

said low resistance, eddy current-developing conductive material is connected to a ground potential whereby said low resistance, eddy current-developing conductive material, also acts as an electrostatic shield.

17. The combined support member and grid shield for a digitizer tablet of claim 14 wherein:
the flexible substrate has edge portions which extend beyond side edges of said sheet of a metal and are wrapped around said side edges.

18. In a digitizer tablet having conductive grids on a substrate for use with a powered cursor emitting a magnetic signal detected in the conductive grids, the improvement for increasing useful signal strength and decreasing power requirements in the cursor comprising:
a) a shield member disposed one of (i) in contact with, and (ii) spaced from the substrate, and parallel thereto, said shield member being of a metal having a high magnetic permeability; and wherein,
b) the substrate comprises a pair of rigid substrates disposed in spaced parallel planes, one rigid substrate having the conductive grids thereon and one rigid substrate having interconnects thereon; and,
c) said shield member is disposed between said pair of rigid substrates.

19. In a digitizer tablet having conductive grids on a substrate for use with a powered cursor emitting a magnetic signal detected in the conductive grids, the improvement for increasing useful signal strength and decreasing power requirements in the cursor comprising:
a) a shield member disposed one of (i) in contact with, and (ii) spaced from the substrate, and parallel thereto, said shield member being of a metal having a high magnetic permeability; and,
b) a low resistance, eddy current-developing conductive material disposed over an outer surface of the substrate whereby signal errors caused by said shield member are reduced.

20. The improvement to a digitizer tablet of claim 19 wherein:
said low resistance, eddy current-developing conductive material is a metal foil.

21. The improvement to a digitizer tablet of claim 19 wherein:
said low resistance, eddy current-developing conductive material is connected to a ground potential whereby said low resistance, eddy current-developing conductive material also acts as an electrostatic shield.

22. The improvement to a digitizer tablet of claim 19 wherein:
a) the substrate is a flexible substrate; and,
b) said shield member is disposed to support the flexible substrate.

23. The improvement to a digitizer tablet of claim 19 wherein:
said metal is a metal having an initial permeability of at least 5,000.

24. The improvement to a digitizer tablet of claim 19 wherein:
said metal is a NiFe alloy having an initial permeability sufficiently high to qualify it as a mu-metal.

25. The improvement to a digitizer tablet of claim 19 wherein:
a) said shield member is a square sheet of material substantially the size of a square X-Y axis coordinate system of the digitizer tablet; and,
b) the flexible substrate has edge portions which extend beyond side edges of said shield member and are wrapped around said side edges.

26. A high efficiency digitizer tablet for use with a cordless electro-magnetic transmitting cursor to reduce required signal strength from the cursor and extend battery life thereof comprising:
a) a first rigid planar substrate having a pattern of conductive grids thereon; and,
b) a second rigid planar substrate having interconnects thereon disposed parallel to and spaced from said first rigid planar substrate; and,
c) a shield member of a metal having a high magnetic permeability disposed between said first rigid planar substrate and said second rigid planar substrate.

27. The high efficiency digitizer tablet of claim 26 wherein:
said shield member is a metal having an initial permeability of at least 5,000.

28. The high efficiency digitizer tablet of claim 26 wherein:
said shield member is a NiFe alloy having an initial permeability value sufficiently high to qualify it as $\mu$-metal.

29. The high efficiency digitizer tablet of claim 26 and additionally comprising:
a low resistance, eddy current-developing conductive material disposed over an outer surface of the first rigid planar substrate whereby signal errors caused by said shield member are reduced.

30. The high efficiency digitizer tablet of claim 29 wherein:
said low resistance, eddy current-developing conductive material is a metal foil.

31. The high efficiency digitizer tablet of claim 29 wherein:
said low resistance, eddy current-developing conductive material is connected to a ground potential whereby said low resistance, eddy current-developing conductive material also acts as an electrostatic shield.

32. The combined support member and grid shield for a digitizer tablet of claim 14 wherein:
said sheet of a metal is a metal having an initial permeability of at least 5,000.

33. The combined support member and grid shield for a digitizer tablet of claim 14 wherein:
said sheet of a metal is a NiFe alloy having an initial permeability sufficiently high to qualify it as a mu-metal.

* * * * *